United States Patent
Dai

(10) Patent No.: US 8,580,370 B2
(45) Date of Patent: Nov. 12, 2013

(54) ADHESIVE ASSEMBLY AND METHOD FOR MAKING SAME

(75) Inventor: Bin Dai, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 63 days.

(21) Appl. No.: 13/158,594

(22) Filed: Jun. 13, 2011

(65) Prior Publication Data

US 2012/0121855 A1 May 17, 2012

(30) Foreign Application Priority Data

Nov. 16, 2010 (CN) .......................... 2010 1 0546382

(51) Int. Cl.
*B32B 3/24* (2006.01)
*B32B 3/30* (2006.01)
*B32B 7/12* (2006.01)
*B29C 65/54* (2006.01)

(52) U.S. Cl.
USPC .......... 428/138; 428/131; 428/137; 428/156; 428/166; 428/172; 428/195.1; 156/305

(58) Field of Classification Search
USPC ....................................................... 156/305
See application file for complete search history.

(56) References Cited

U.S. PATENT DOCUMENTS

| | | | | |
|---|---|---|---|---|
| 3,532,316 A * | 10/1970 | Gunther | .................. | 248/205.3 |
| 3,995,401 A * | 12/1976 | Smith | ..................... | 52/127.4 |
| 4,250,596 A * | 2/1981 | Hara et al. | ................. | 24/289 |
| 4,802,177 A * | 1/1989 | Yamagishi et al. | ............. | 372/36 |
| 4,812,193 A * | 3/1989 | Gauron | ..................... | 156/293 |
| 4,857,130 A * | 8/1989 | Curtis | ....................... | 156/292 |
| 5,196,153 A * | 3/1993 | Kramer | ..................... | 264/263 |
| 5,685,577 A * | 11/1997 | Vanesky | ................... | 285/294.3 |
| 7,114,541 B2 * | 10/2006 | Howitz et al. | ............ | 156/349 |
| 7,207,543 B2 * | 4/2007 | Ortwein | .................... | 248/467 |
| 2003/0145942 A1* | 8/2003 | Andrews et al. | ............. | 156/285 |
| 2006/0175732 A1* | 8/2006 | Masuch | ...................... | 264/261 |
| 2008/0102249 A1* | 5/2008 | Ristoski et al. | .............. | 428/138 |
| 2009/0081464 A1* | 3/2009 | Summersgill et al. | ...... | 428/411.1 |
| 2009/0095408 A1* | 4/2009 | LeCompte et al. | ........... | 156/145 |
| 2009/0226703 A1* | 9/2009 | Zheng et al. | ................. | 428/320.2 |

FOREIGN PATENT DOCUMENTS

| | | | | |
|---|---|---|---|---|
| DE | 4210072 A1 * | 3/1993 | ............. | B05C 1/02 |
| DE | 19512936 A1 * | 11/1996 | ............. | B29C 65/52 |
| DE | 102008058389 * | 5/2010 | ............. | C09J 5/00 |
| EP | 1396385 A1 * | 3/2004 | ............. | B60R 11/00 |
| JP | 55055824 A * | 4/1980 | ............. | B29C 27/10 |
| JP | 63177383 A * | 7/1988 | ............. | G11B 23/00 |
| JP | 10002760 A * | 1/1998 | ............. | G01D 5/36 |
| JP | 2000299073 A * | 10/2000 | ............. | H01J 29/82 |

OTHER PUBLICATIONS

English Abstract JP 63177383 A, Jul. 1988.*

* cited by examiner

*Primary Examiner* — David Sample
*Assistant Examiner* — Jeff Vonch
(74) *Attorney, Agent, or Firm* — Altis & Wispro Law Group, Inc.

(57) ABSTRACT

An adhesive assembly includes a first member, a second member, and an adhesive. The first member includes a first surface, a receiving groove defined in the first surface, a flowing groove defined in the first surface apart from the receiving groove, an injecting inlet defined in the bottom surface of the receiving groove, and an outlet defined in the bottom surface of the flowing groove. The flowing groove partially communicates with the receiving groove. The adhesive is injected in the receiving groove through the injecting inlet to adhere the first member to the second member. A method for making the adhesive assembly is also provided.

6 Claims, 6 Drawing Sheets

ADHESIVE ASSEMBLY AND METHOD FOR MAKING SAME

BACKGROUND

1. Technical Field

The present disclosure relates to adhesive assemblies, particularly to an adhesive assembly and a method for making the same.

2. Description of Related Art

The assembly of a typical electronic device usually involves many different components fixed together by an adhesive. A component to be adhered has a receiving groove, an injecting inlet communicating with the receiving groove to allow the adhesive to be injected in the receiving groove, and an outlet communicating with the receiving groove and the external environment to exhaust gas from the receiving groove as it is being replaced by the adhesive. However, the adhesive may flow out of the receiving groove through the outlet thereby obstructing the outlet and affecting the overall assembly of the electronic device.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of adhesive assembly and method for making the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
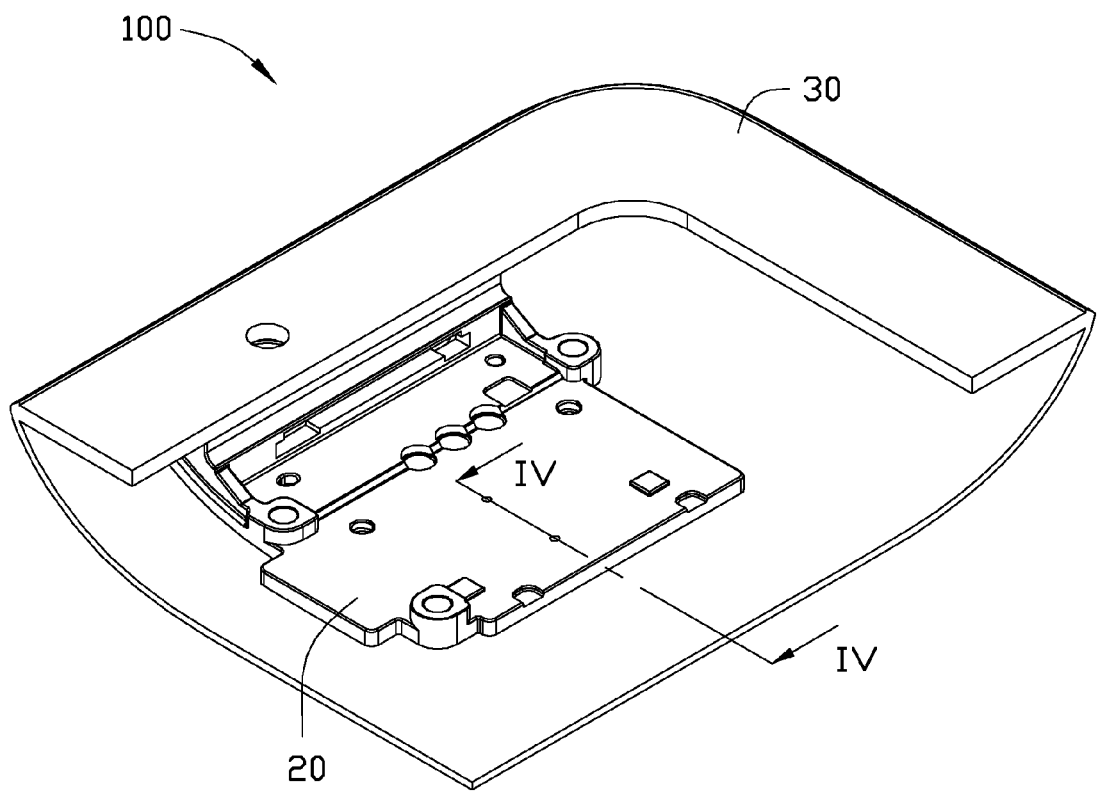
FIG. 1 is a partial, isometric view of an embodiment of an adhesive assembly.
Figure 2:
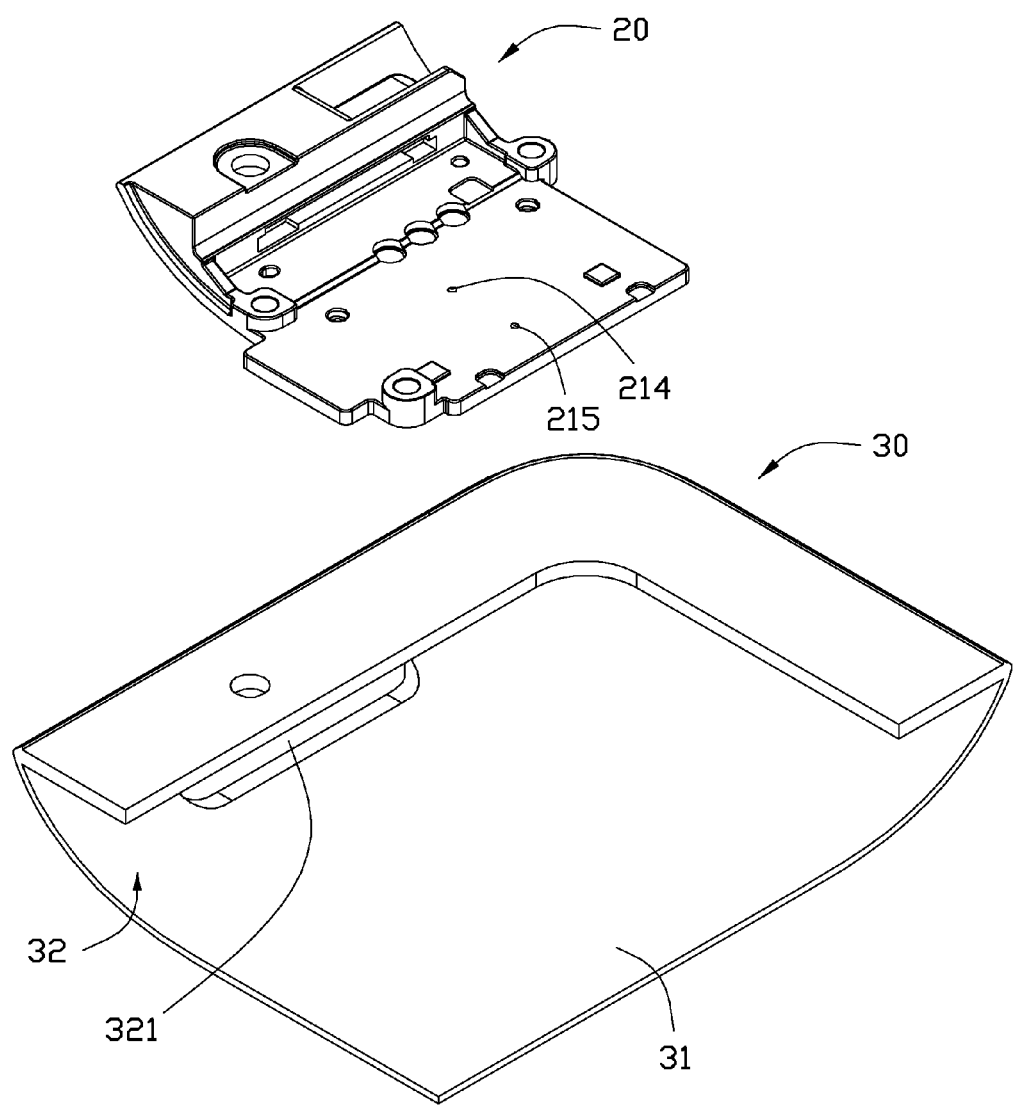
FIG. 2 is an exploded, isometric view of the adhesive assembly of FIG. 1.
Figure 3:
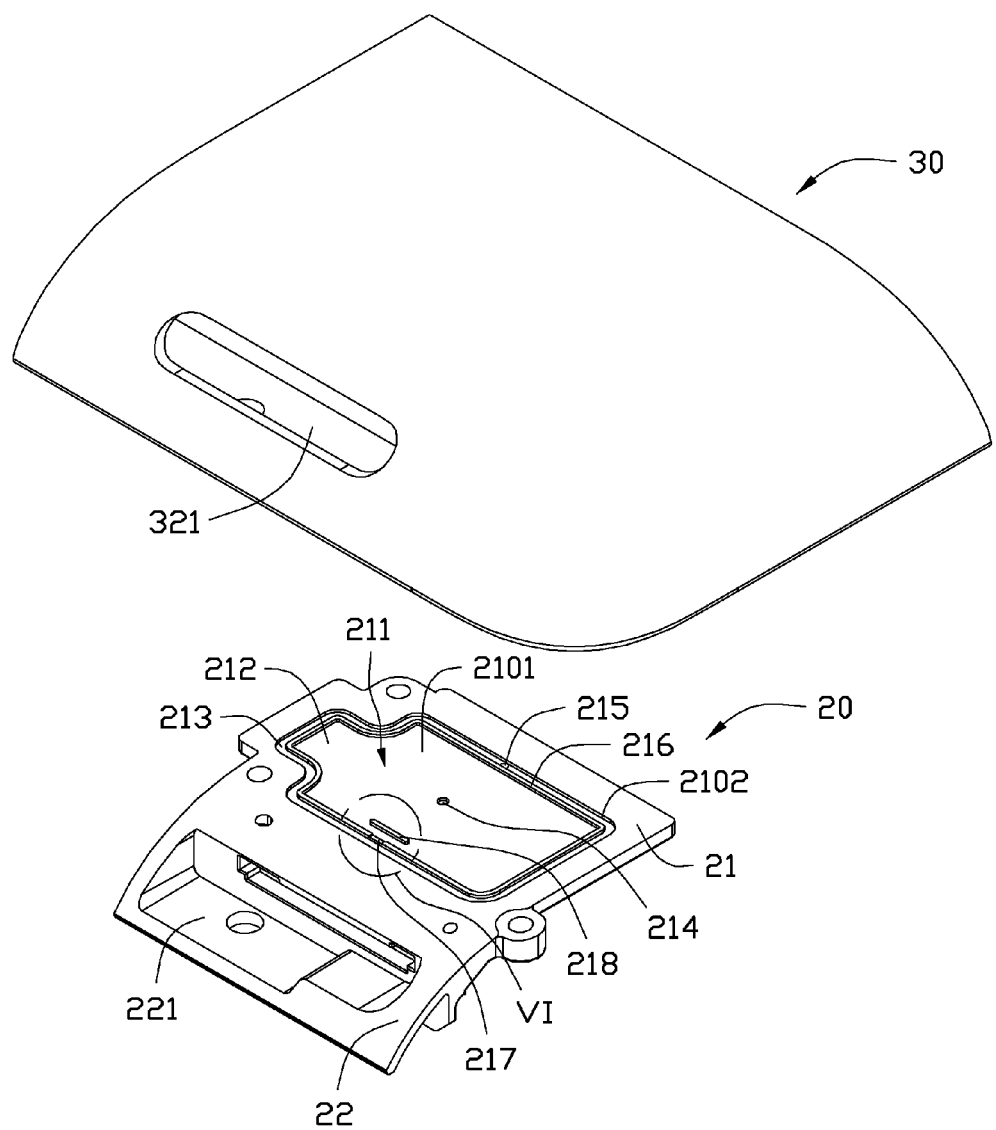
FIG. 3 is similar to FIG. 2, but viewed from another angle.
Figure 4:
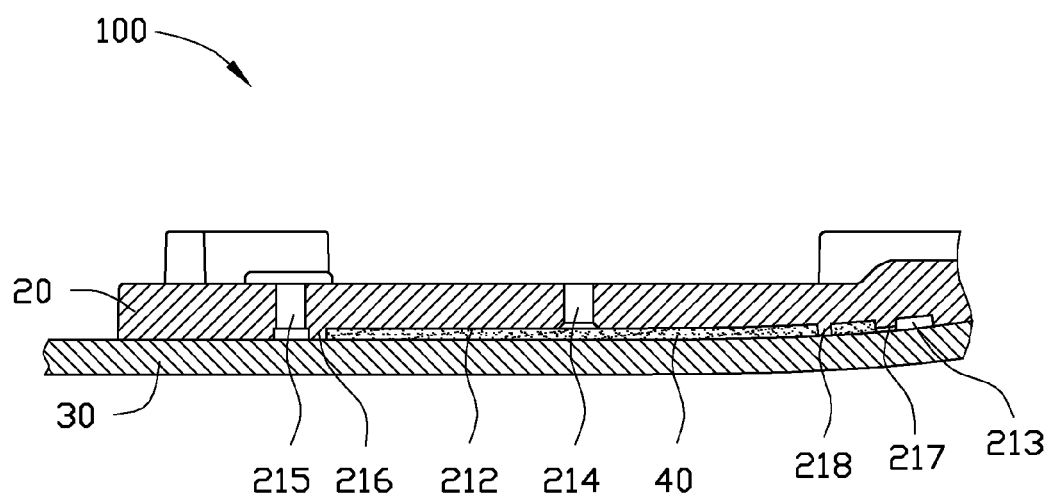
FIG. 4 is a partial, cross-sectional view of the adhesive assembly of FIG. 1, taken along line IV-IV.

Referring to FIG. 1 through FIG. 4, an embodiment of an adhesive assembly 100 includes a first member 20, a second member 30, and adhesive 40. The first member 20 is adhered to the second member 30 by the adhesive 40. The adhesive assembly 100 may be a subassembly of a laptop computer, a desktop computer, a liquid crystal display, or other electronic devices. In the illustrated embodiment, the adhesive assembly 100 is a part of a panel computer, the first member 20 being a supporting member of a subscriber identity module (SIM) card of the panel computer, and the second member 30 being a housing of the panel computer.

Referring to FIG. 3 again, the first member 20 includes a first surface 21 and a groove 211 defined in the first surface 21. A bottom surface 2101 and a plurality of inner surfaces 2102 cooperatively define the groove 211. The groove 211 can be substantially bottle-shaped. A continuous flange 216 is formed on the bottom surface 2101 adjacent to the inner surfaces 2102. A top surface of the flange 216 is substantially coplanar with the first surface 21. The bottom surface 2101 and the flange 216 cooperatively define a receiving groove 212. The flange 216 and the inner surfaces 2102 cooperatively define a flowing groove 213 surrounding the receiving groove 212. In the illustrated embodiment, the center of the bottom of the receiving groove 212 defines an injecting inlet 214 to allow the adhesive 40 to be injected into the receiving groove 212. The bottom surface 2101 of the flowing groove 213 defines an outlet 215 to exhaust gas. The outlet 215 balances the internal and external air pressure of the receiving groove 212 and prevents obstruction of the adhesive.

Figure 6:
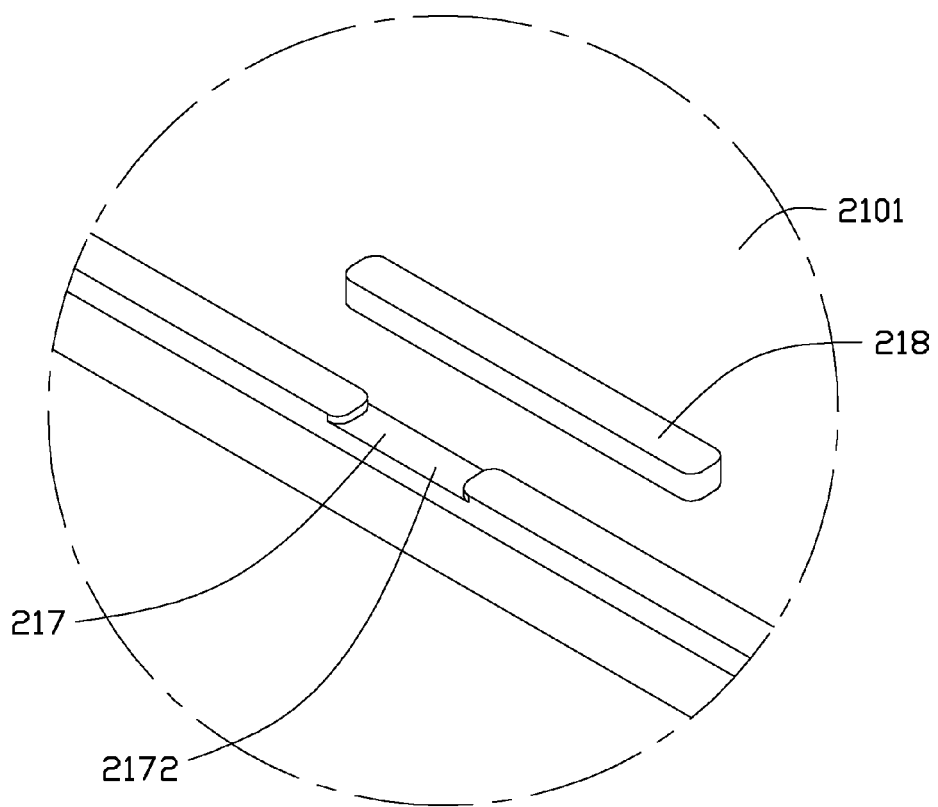
FIG. 6 is an enlarged view of circled portion VI of FIG. 3.

Also referring to FIG. 6, the flange 216 defines a flow opening 217 at a top of the flange 216 away from the outlet 215 to communicate the flowing groove 213 with the receiving groove 212. A bottom surface 2172 of the flow opening 217 is above the bottom surface 2101 of the receiving groove 212. A protruding rod 218 is fitted on the bottom surface 2101 of the receiving groove 212 adjacent to the flow opening 217 to prevent the adhesive 40 from flowing into the flowing groove 213 through the flow opening 217. Preferably, the length of the protruding rod 218 is slightly greater than the size of the flow opening 217. The size of the flow opening 217 should be commensurate with the viscosity of the adhesive 40 to ensure the receiving groove 212 communicates with air or the external environment.

In alternative embodiments, two or more flow openings 217 can be defined in the flange 216 to allow additional channels of communication between the receiving groove 212 and the flowing groove 213.

The first member 20 further includes a side surface 22 connected to the first surface 21. The side surface 22 can be cambered. The side surface 22 also defines an inserted hole 221.

The second member 30 includes a second surface 31 corresponding to the first surface 21, and a side surface 32 connected to the second surface 31. The side surface 32 defines an inserted hole 321 corresponding to the inserted hole 221 of the first member 20. A SIM card (not shown) can be inserted in the adhesive assembly 100 through the inserted holes 321, 221.

In alternative embodiments, the injecting inlet 214 can be defined in the second surface 31 communicating with the receiving groove 212.

In alternative embodiments, the outlet 215 can be defined in the second surface 31 communicating with the receiving groove 212.

In alternative embodiments, the rectangular groove 211 can be defined in the second surface 31, and the receiving groove 212, the flowing groove 213, the injecting inlet 214, and the outlet 215 all defined in the second surface 31 correspondingly.

In the illustrated embodiment, the adhesive 40 is epoxy resin adhesive. The adhesive 40 can be acrylic resin adhesive, phenolic resin adhesive, or polyurethane adhesive depending on the material of the first member 20 and the second member 30.

Figure 5:
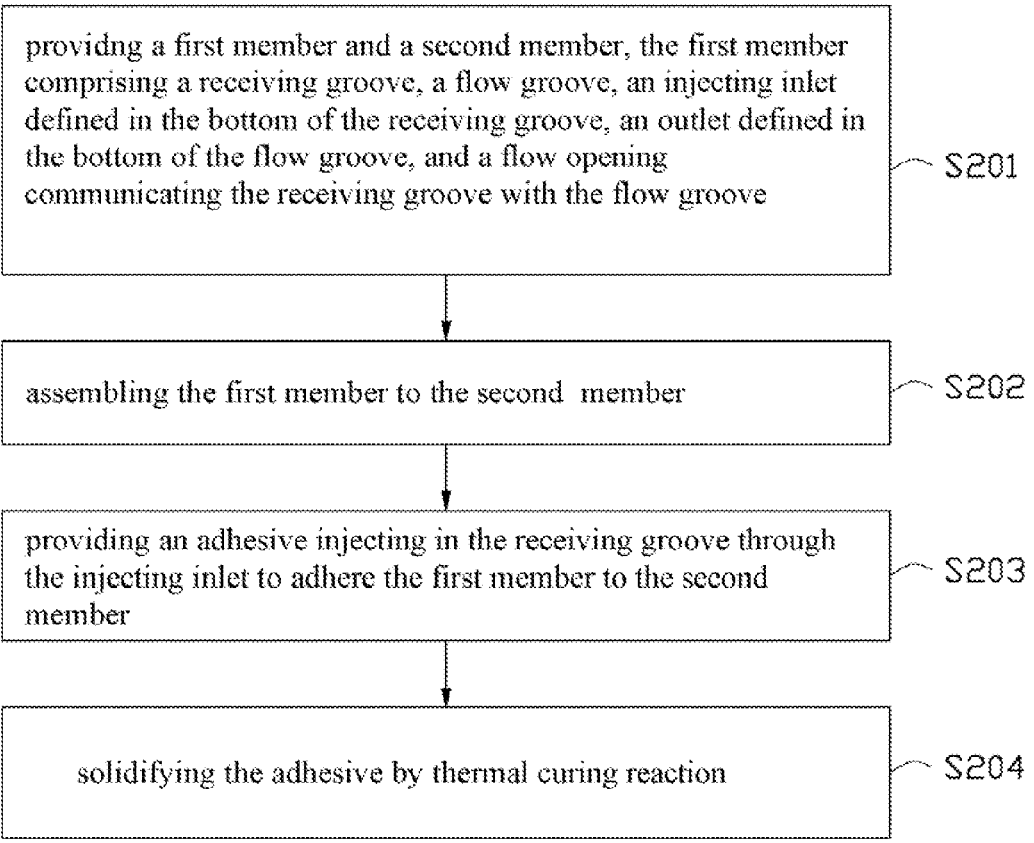
FIG. 5 is a flowchart of an embodiment of a method for making an embodiment of an adhesive assembly of the present disclosure.

Referring to FIG. 5, an embodiment of a method for making the adhesive assembly 100 is as follows.

In step S201, the first member 20 and the second member 30 are provided. In the illustrated embodiment, the first member 20 includes the receiving groove 212, the flowing groove 213, the injecting inlet 214 defined in the bottom surface of the receiving groove 212, the outlet 215 defined in the bottom surface of the flowing groove 213, and the flow opening 217 communicating the receiving groove 212 with the flowing groove 213.

In step S202, the first member 20 is placed on the second member 30. At this time, the injecting inlet 214 aligns to the center of the adhesive surface 31, and the inserted hole 221 of the first member 20 aligns to the inserted hole 321 of the second member 30.

In step S203, the adhesive 40 is provided and injected in the receiving groove 212 through the injecting inlet 214, such that the adhesive 40 flows from the center of the bottom surface of the receiving groove 212 towards the flange 216.

In step S204, the adhesive 40 can be solidified by thermal curing reaction, such that the first member 20 is fixedly adhered to the second member 30. In alternative embodiments, the step S204 can be omitted or replaced by other methods depending on the adhesive 40 used.

In summary, the flowing groove 213 surrounding the receiving groove 212 communicates with groove 212, the outlet 215 defined in the flowing groove 213 communicates with the receiving groove 212, and the receiving groove 212 communicates with the external environment. The above method can maintain the balance of internal and external air pressure of the receiving groove 212 and avoid the adhesive 40 overflowing during the injection of adhesive 40. Thus the quality of the adhesive assembly 100 is improved.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An adhesive assembly comprising:
    a first member comprising:
        a first surface defining a groove thereon, the groove comprising a bottom surface and a plurality of inner surfaces surrounding the bottom surface;
        a continuous flange formed on the bottom surface adjacent to a plurality of inner surfaces to divide the groove into a receiving groove and a flowing groove surrounding the receiving groove;
        an injecting inlet defined in the bottom surface of the receiving groove; and
        an outlet defined in the bottom surface of the flowing groove,
        wherein the continuous flange has a top surface substantially coplanar with the first surface, the continuous flange defines a flow opening into the top surface of the continuous flange away from the outlet, a bottom surface of the flow opening is above the bottom surface of the receiving groove, and the flowing groove communicates with the receiving groove only via the flow opening;
    a second member facing the first surface; and
    an adhesive solidified in the receiving groove to adhere the first member to the second member, wherein the adhesive is injected into the receiving groove through the injecting inlet.

2. The adhesive assembly of claim 1, wherein the first member further comprises a protruding rod formed on the bottom surface of the receiving groove adjacent to the flow opening.

3. The adhesive assembly of claim 2, wherein the length of the protruding rod is greater than that of the flow opening.

4. The adhesive assembly of claim 1, wherein the size of the flow opening corresponds to a viscosity of the adhesive.

5. The adhesive assembly of claim 1, wherein the injecting inlet is defined in a center of the bottom surface of the receiving groove.

6. The adhesive assembly of claim 1, wherein the adhesive is selected from the group consisting of epoxy resin adhesive, acrylic resin adhesive, phenolic resin adhesive, and polyurethane adhesive.

* * * * *